(12) United States Patent
Haas et al.

(10) Patent No.: US 8,238,349 B2
(45) Date of Patent: Aug. 7, 2012

(54) METHOD OF ACCESSING STORED INFORMATION IN MULTI-FRAMED DATA TRANSMISSIONS

(75) Inventors: Wally Haas, Mount Pearl (CA); Michael Kenneth Anstey, St. John's (CA)

(73) Assignee: Altera Canada Co., Halifax, NS (CA)

( * ) Notice: Subject to any disclaimer, the term of this patent is extended or adjusted under 35 U.S.C. 154(b) by 1085 days.

(21) Appl. No.: 12/141,157

(22) Filed: Jun. 18, 2008

(65) Prior Publication Data
US 2009/0319729 A1    Dec. 24, 2009

(51) Int. Cl.
*H04L 12/28* (2006.01)
*H04L 12/50* (2006.01)

(52) U.S. Cl. .......... 370/395.7; 370/379; 370/382

(58) Field of Classification Search .......... 370/395.7, 370/379, 382
See application file for complete search history.

(56) References Cited

U.S. PATENT DOCUMENTS

| | | | | |
|---|---|---|---|---|
| 4,171,538 A * | 10/1979 | Sheller | ............ | 711/170 |
| 4,764,941 A * | 8/1988 | Choi | ............ | 375/363 |
| 5,067,126 A * | 11/1991 | Moore | ............ | 370/544 |
| 5,185,736 A | 2/1993 | Tyrrell et al. | | |
| 5,359,605 A * | 10/1994 | Urbansky et al. | ............ | 370/366 |
| 5,404,380 A * | 4/1995 | Powell et al. | ............ | 375/363 |
| 5,717,693 A * | 2/1998 | Baydar et al. | ............ | 370/514 |
| 5,742,765 A | 4/1998 | Wong et al. | | |
| 5,822,304 A | 10/1998 | Brody et al. | | |
| 5,862,136 A * | 1/1999 | Irwin | ............ | 370/395.4 |
| 6,157,658 A * | 12/2000 | Toyoyama et al. | ............ | 370/505 |
| 6,195,346 B1 * | 2/2001 | Pierson, Jr. | ............ | 370/352 |
| 6,195,436 B1 * | 2/2001 | Scibora et al. | ............ | 381/77 |
| 6,338,125 B1 * | 1/2002 | Kopser et al. | ............ | 711/150 |
| 6,952,824 B1 * | 10/2005 | Hooper et al. | ............ | 718/100 |

(Continued)

OTHER PUBLICATIONS

Ford, W. S., and V. C. Hamacher. "Hardware Support for Interprocess Communication and Processor Sharing." International Symposium on Computer Architecture: Proceedings of the 3rd Annual Symposium on Computer Architecture. 1976. pp. 113-118.
International Telecommunication Union: Telecommunication Standardization Sector (ITU-T) "Interfaces for the Optical Transport Network (OTN)." (Mar. 2003).

*Primary Examiner* — Hieu Hoang
(74) *Attorney, Agent, or Firm* — Ropes & Gray LLP

(57) ABSTRACT

The present invention discloses a method of accessing stored information in multi-framed data transmissions, comprising at least one control interface and at least one elastic store, wherein the control interface accesses the elastic store through a mailbox communications method. The control interface accesses the elastic store via the mailbox communications method, which comprises: (a) setting a address for a data location within said elastic store; (b) setting a request to read from, or write to, said data location within said elastic store; (c) issuing a "GO_" signal to retrieve data information from said data location within said elastic store, by writing said "GO_" signal to said microprocessor, which causes a circuit to read from said requested data location within said elastic store; (d) waiting for a possible, but not to be expected, de-assertion of a busy signal to be issued from said data location within said elastic store, and then; and then (e) reading back the value of said data information to said control interface. Where a busy signal occurs, the microprocessor must wait and issue a subsequent "GO_" signal to retrieve the data information from the data location; where a busy signal does not occur the "GO_" signal causes the circuit to read from the requested data location and send the data information back to the microprocessor, where the data information is stored in a user-accessible register.

16 Claims, 5 Drawing Sheets

U.S. PATENT DOCUMENTS

| | | |
|---|---|---|
| 7,068,685 B1 | 6/2006 | Sihvola |
| 7,924,938 B2 * | 4/2011 | Haas .............................. 375/295 |
| 7,933,156 B2 * | 4/2011 | Ruthemann .............. 365/189.05 |
| 2002/0097743 A1 * | 7/2002 | Baydar et al. ................. 370/463 |
| 2002/0097754 A1 * | 7/2002 | Arai .............................. 370/519 |
| 2007/0180431 A1 | 8/2007 | Agarwala et al. |

* cited by examiner

METHOD OF ACCESSING STORED INFORMATION IN MULTI-FRAMED DATA TRANSMISSIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field of the Invention

The present invention relates to the storage and accessibility of information in multi-framed data transmission.

2. Background of the Invention

In multi-framed data transmission networks, such as Synchronous Optical Networking (SONET), Synchronous Digital Hierarchy (SDH) and Optical Transport Networking (OTN), the payload and overhead of data frames are transmitted through interleaving, with a portion of overhead being transmitted, then a portion of payload, then another portion of overhead, etc., until the entire frame has been transmitted. In both SONET and SDH the entire frame is transmitted in 125 microseconds; the SONET frame totals 810 octets in size, 27 octets of overhead with 783 octets of payload, while the SDH frame totals 2430 octets in size, 81 octets of overhead with 2349 octets of payload. OTN transmission is 4080 columns (bytes) by four rows. As part of data transmission, messages called trace messages are used to convey information from one Network Element (NE) to another. These messages are not transmitted at once; normally they are transmitted one byte at a time. Therefore, once data has been transmitted, an elastic store must hold the information until a decision is made regarding the next action. Often the data is held in registers, or a number of flip-flops, and depending on the presence of an alignment signal, such as the Multi-Frame Alignment Signal (MFAS) in OTN, the data can be associated with such alignment signal. However, other multi-framed data transmission networks, such as SONET or SDH, have no such multi-frame alignment signal, so the data can constantly rotate and change locations within the frame. In each case, the elastic store may be used to store information in the place of registers, as the elastic store may require less area in a chip than registers require. However, the use of an elastic store prevents the data contents from being directly addressable, and the data stored in the elastic store is not accessible by a microprocessor.

BRIEF SUMMARY OF THE INVENTION

The object of the present invention is to provide a method for the storage of data in multi-framed data transmission, employing a dedicated elastic store, such as Random Access Memory (RAM), as the storage element, while improving upon the abovementioned prior art. It is known in the art that while RAM requires less area in a chip necessary for storage than the amount of area necessary for registers, RAM prevents the data contents from being directly addressable, and the information stored in RAM is not accessible by a microprocessor. In order for the microprocessor to identify what information is stored in RAM, a particular address or offset must be requested: the present invention therefore discloses a novel method to request such information to be transmitted to the microprocessor, a mailbox communications method.

DETAILED DESCRIPTION OF THE INVENTION

Figure 1:
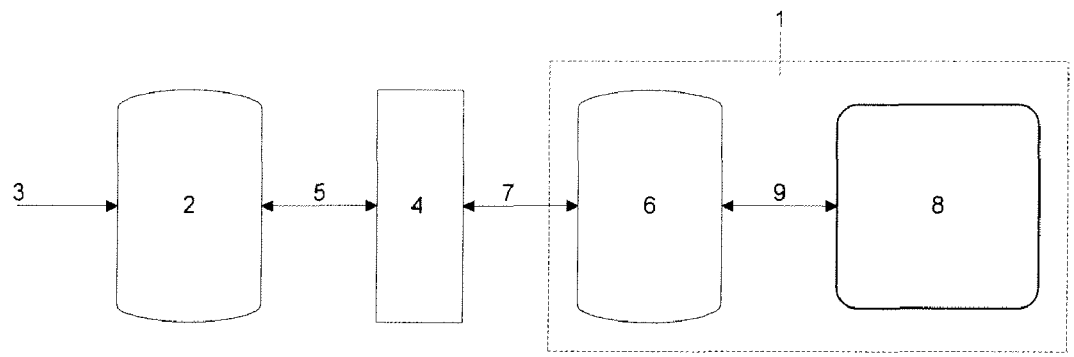
FIG. 1 is a block diagram detailing a top level structure of the invention.
Figure 2:
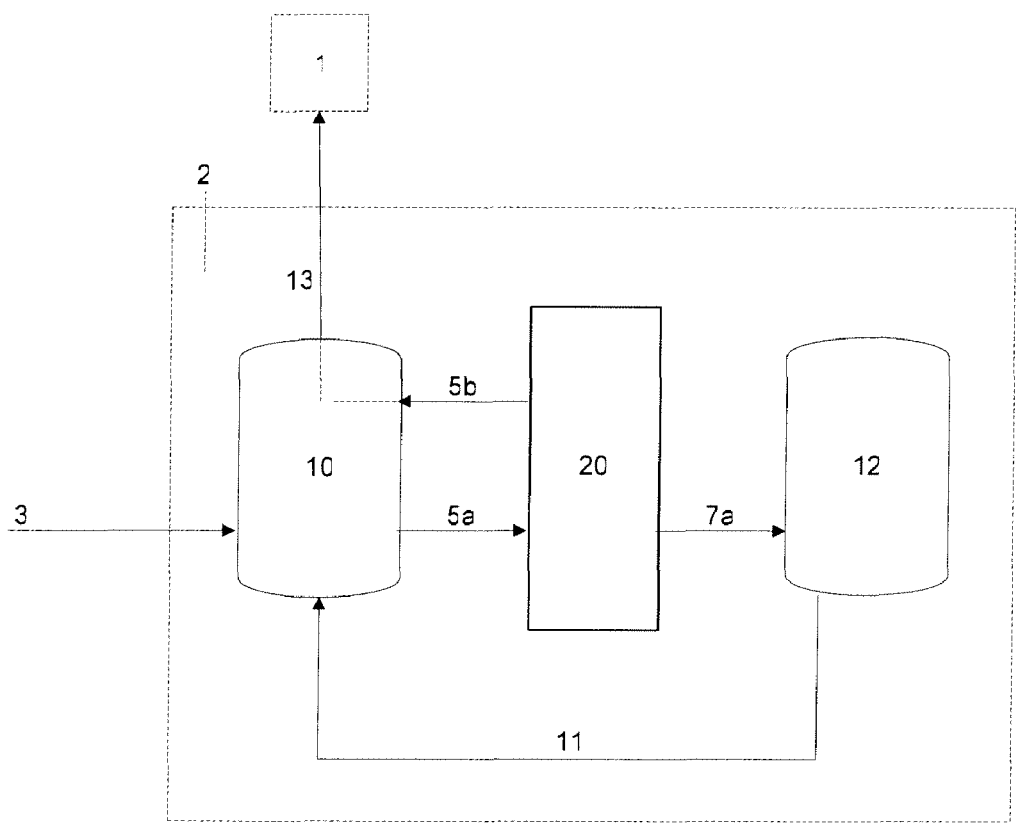
FIG. 2 is a block diagram detailing the structure of the first Finite State Machine (FSM) (2) of FIG. 1.
Figure 3:
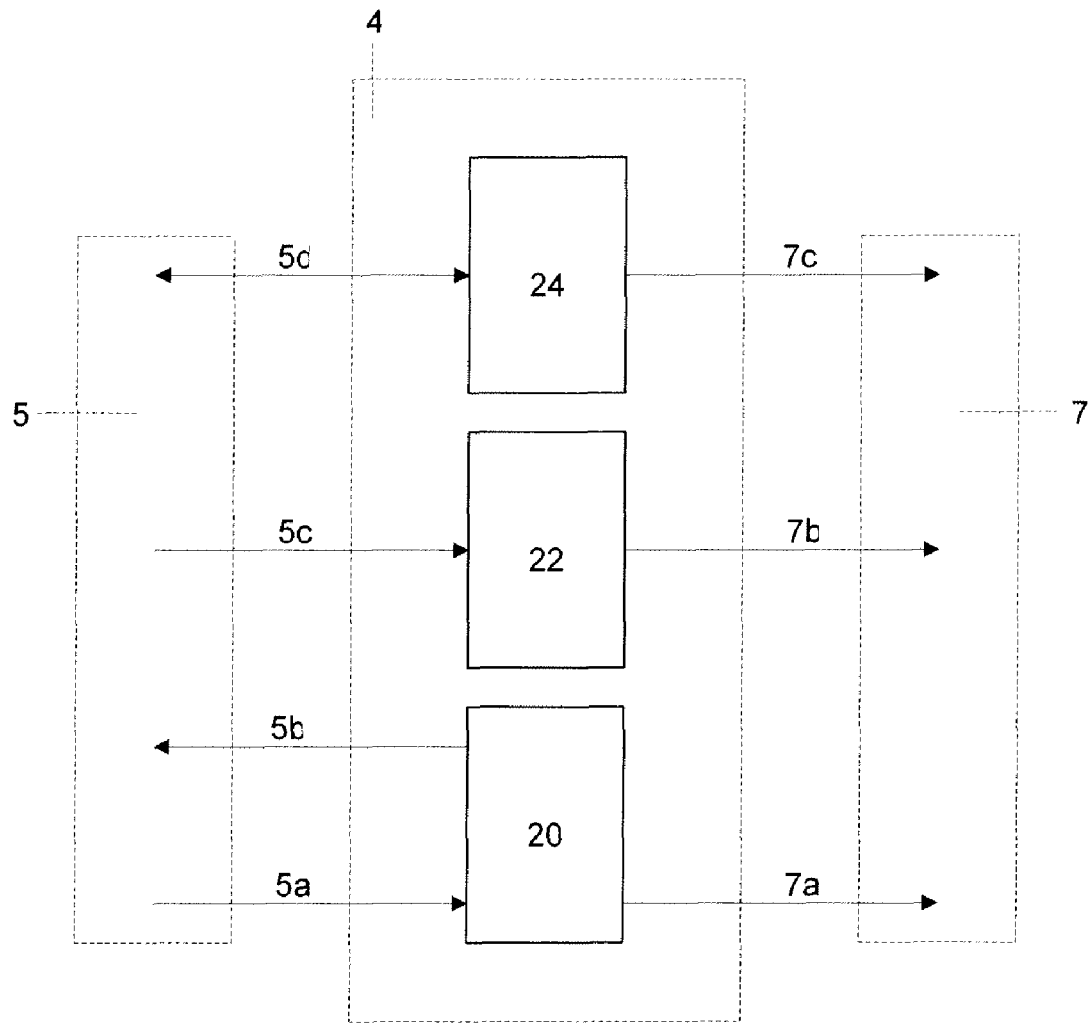
FIG. 3 is a block diagram detailing the structure of RAM (4) of FIG. 1.
Figure 4:
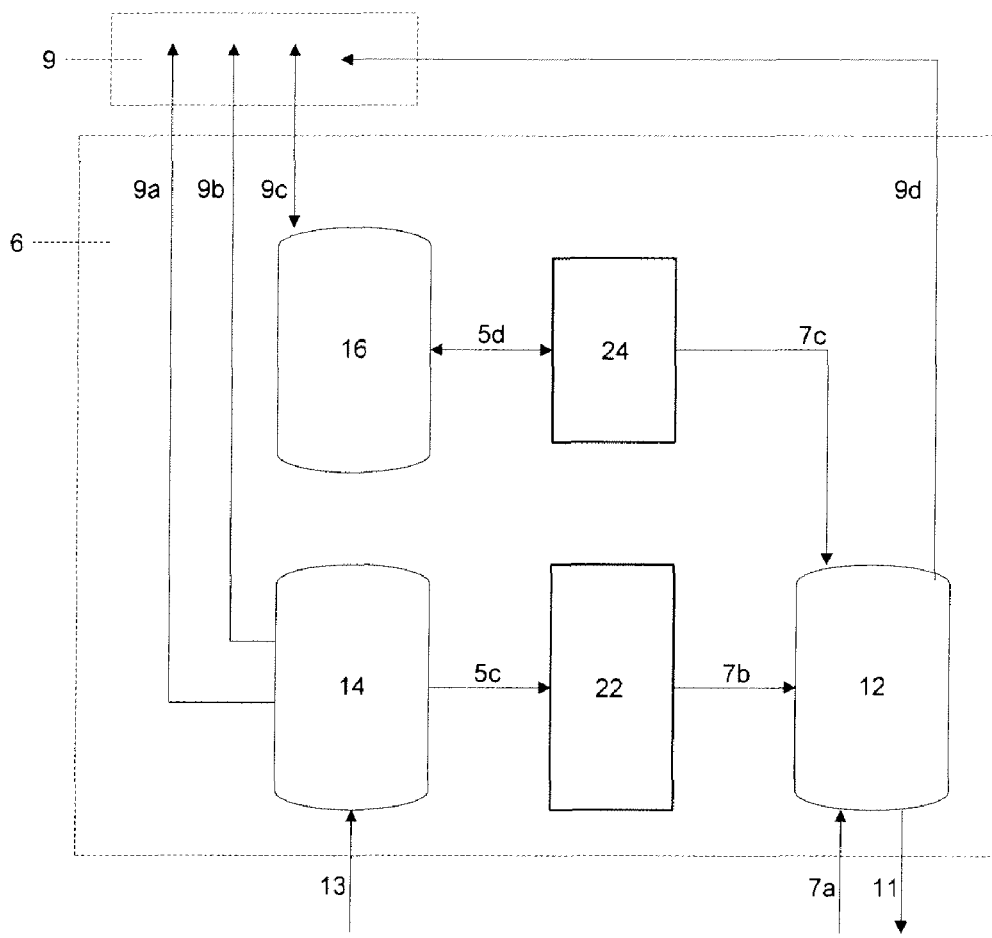
FIG. 4 is a block diagram detailing the structure of the second FSM (6) of FIG. 1.

The present invention substantially comprises ubiquitous, dual-port RAM interfacing with Finite State Machines (FSMs). As shown in FIG. 1, frame signal inputs from a frame datapath (3) arrive at a first FSM (2). This FSM (2) can write data to (5), and read data from (5), a dual-port RAM (4): therefore, FSM (2) can retrieve the frame signal inputs from the datapath (3) and the previous state from RAM (4) and use both to calculate the next state. Once the next state information is written into (5) RAM (4), a mailbox communications method (I) can be used to allow a microprocessor software interface, or Register Map (REGMAP) (8) to access the information. REGMAP (8), which can write data to (9), and read data from (9), a second FSM (6), outputs signals (9) to the second FSM (6), including a "GO-" signal which initiates the transaction. The second FSM (6), which can write data to (7), and read data from (7) RAM (4), can access RAM (4) to read out the information (7), and then the second FSM (6) writes the data (9) to REGMAP (8). This combination of RAM and FSMs reduces the overall circuit size required for multi-frame data transmissions.

DETAILED DESCRIPTION OF AN ILLUSTRATIVE EMBODIMENT OF THE INVENTION

The following illustrative embodiment of the present invention is intended for explanative purposes and is not intended to limit the scope of the present invention. While in this illustrative embodiment of the present invention, the use of a mailbox communications method to monitor and generate trace information in an OTN frame is disclosed, the use of this mailbox communications method in the storage and accessibility of information during multi-framed data transmission is applicable to other types of data information found in other types of data transmission systems, such as SONET, SDH and other methods of communications.

The illustrative embodiment of the present invention discloses the monitoring and generation of a multi-frame OTN message, the Trail Trace Identifier (TTI). The TTI is a 64 byte message, transmitted over 64 frames, where 1 TTI byte is received per frame, and the message is repeated 4 times per multi-frame, or every 256 frames. The first 16 bytes represent the Source Access Point Identifier (SAPI), the next 16 bytes represent the Destination Access Point Identifier (DAPI) and the final 32 bytes are operator specific. In order to access each of the 64 bytes of the TTI message, a 6 bit access address width is chosen; the microprocessor software interface, or Register Map (REGMAP), utilizes this access address. The 8 bit MFAS value, which is used to determine which of the 256 frames within the multiframe is being accessed, is used to properly align the TTI message byte to the correct frame.

Figure 6:
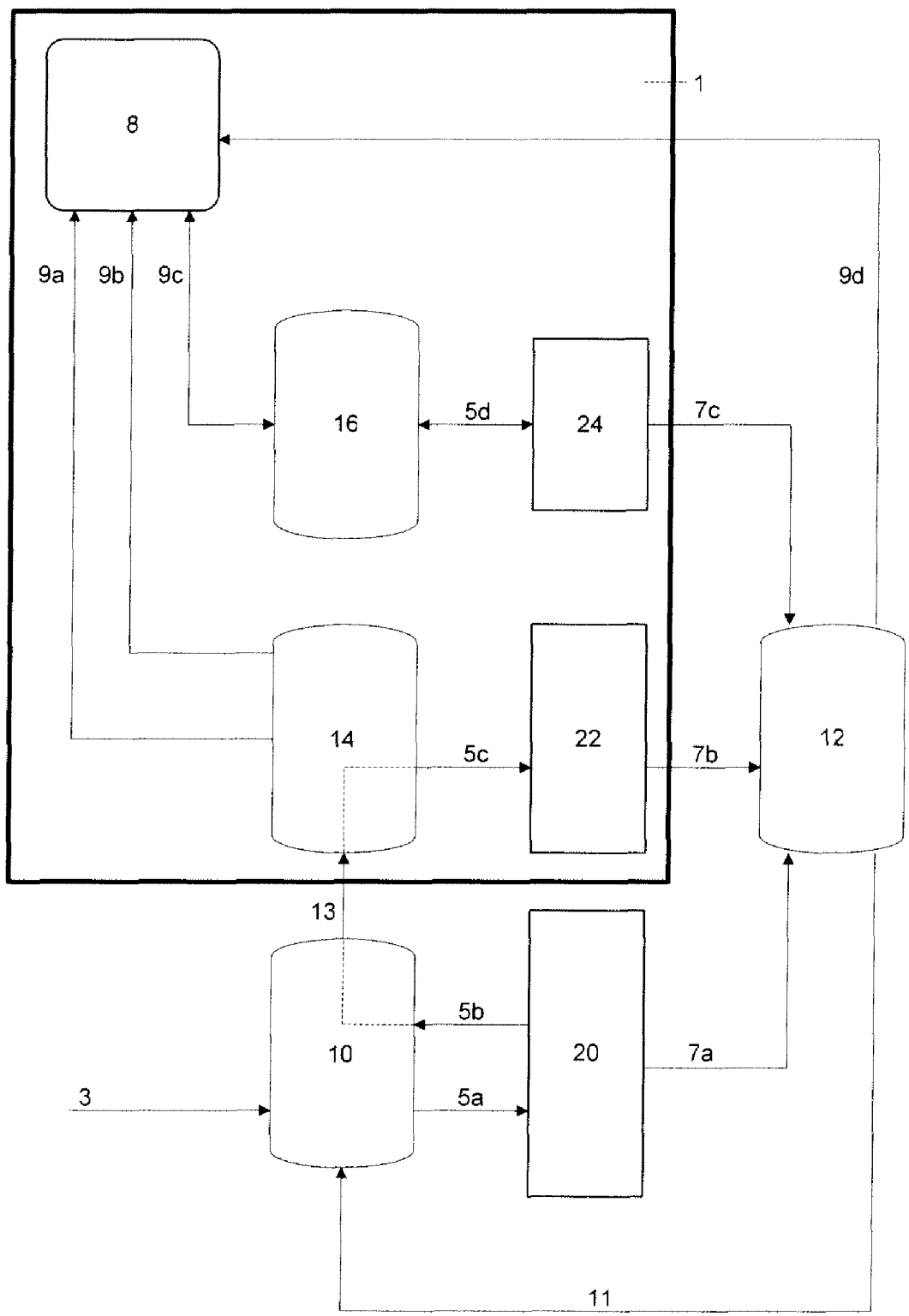
FIG. 6 is a block diagram detailing the monitoring side of the complete illustrative embodiment of the invention, with the mailbox communications method highlighted.

In the illustrative embodiment of the invention, as demonstrated in FIG. 6, the monitoring of trace or other messages begins when the MFAS and other frame signal inputs transmitted on the OTN frame datapath (3) arrive at the "Incoming Read/write Finite State Machine" (10). This Incoming FSM (10) writes the received data (5a) into a 192 byte "Incoming Data RAM" (20), using the MFAS signal to determine which byte, or location, of Incoming RAM (20) the data will be written into: OTN frame #0 is written into location #0; OTN frame #1 is written into location #1, etc. Incoming RAM (20) is able to store three equal 64 byte messages: the first 64 byte message that arrives is therefore written into locations #0-#63; the second 64 byte message is written into locations #64-#127; and the final 64 byte message is written into locations #128-#191. The incoming message is repeated every 64 frames.

Once the data is stored in Incoming RAM (20), another FSM, the "Read Finite State Machine" (12), reads out the bytes (7a) from Incoming RAM (20) to check for three equal 64 byte messages. Once three equal 64 byte messages arrive in a row, a new, validated message can be declared. Therefore, each byte is read out (7a) from Incoming RAM (20) into the Read FSM (12) and compared with previous bytes from prior frames. When the messages are equal a counter is implemented, and when the counter reaches 64, indicating 3 equal 64 byte messages in a row, a flag is raised to indicate that a newly validated message has occurred. This newly validated message is then sent (11) from the Read FSM (12) back to Incoming FSM (10), triggering Incoming FSM (10) to read out (5b) the newly validated message from Incoming RAM (20) and send the message (13) to a "Validated Read/Write Finite State Machine" (14). In addition to writing the validated message (5c) into a 64 byte "Validated Message RAM" (22), Validated FSM (14) also sends a status signal (9a) to REGMAP (8), to alert it that a validated message has occurred. REGMAP (8), in turn, has the ability to read out (9b) the validated message from Validated FSM (14). The user is then able to determine, through REGMAP (8), whether or not a new expected message should be configured. This simple monitoring process does not change unless a newly validated message is received.

The next step is the comparison of the expected message data with the received and validated message data. As described above, REGMAP (8) is responsible for reading out (9b) validated messages from Validated FSM (14). However, REGMAP (8) is also responsible for signaling a user-defined expected message. This function is carried out through interfacing with a fourth FSM, the "Expected Read/Write Finite State Machine" (16). Once the user inputs the expected message data through REGMAP (8), which writes the data into (9c) Expected FSM (16), Expected FSM (16), in turn, writes the data into (5d) a third RAM, the "Expected Message RAM" (24). This 32 byte Expected RAM (24) stores the SAPI and DAPI, for comparison with the received and validated messages.

The Read FSM (12) can then read out (7c) the expected message stored in Expected RAM (24) and can read out (7b) the validated message stored in Validated RAM (22) to constantly monitor and compare the messages. If a mismatch occurs between the expected and validated messages, the Read FSM (12) will raise a status flag to signal the mismatch (9d) to REGMAP (8). This function can be enabled or disabled.

REGMAP (8) accesses RAM in the present invention through a unique method. As described above, REGMAP (8) is able to write in and read out of Expected RAM (24) and read out of Validated RAM (22): this is done through a mailbox communications method (1).

Allowing REGMAP (8) to access RAM through a mailbox communications method (1) is possible by: (a) setting an address for a data location within RAM; (b) setting a request to read from, or write to, said data location within RAM; (c) issuing a "GO_" signal to retrieve data information from the data location within RAM, by writing the "GO_" signal to REGMAP (8), which causes the circuit to read from the requested data location within RAM; and (d) waiting for a possible, but not to be expected, de-assertion of a busy signal to be issued from the data location within RAM, then (e) reading back the value to REGMAP (8). When reading out of Validated RAM (22), the address locations to read from is first specified (for example, locations 0-63 in a 64 byte TTI message) by setting the location address to read from. Since the validated message can only be read out, a specific read request is not necessary. Instead a "GO_" request must be issued by writing to a software register which will cause the circuit to read from the requested location in Validated RAM (22) and send the value back to REGMAP (8), where it is stored in a user-accessible register within REGMAP (8).

Similarly, for reading out of or writing into Expected RAM (24) using a mailbox communications method (1), the address locations to read from or write to are first specified by setting the location address to read from, followed by a read or write request. A "GO_" request must be issued by writing to a software register. In read mode, this will cause the circuit to read from the requested location in Expected RAM (24) and send the value back to REGMAP (8), where it is stored in a user-accessible register within REGMAP (8). In write mode, the user must wait for the busy signal so a new, user-defined value may now be sent from REGMAP (8) to be written into Expected RAM (24).

If Validated RAM (22) or Expected RAM (24) is busy performing another function when the read out or write in request is received, a busy signal is sent to REGMAP (8) and access will have to wait until the busy signal subsides. The originally requested message can then be transmitted, or a new request may be issued.

Figure 7:
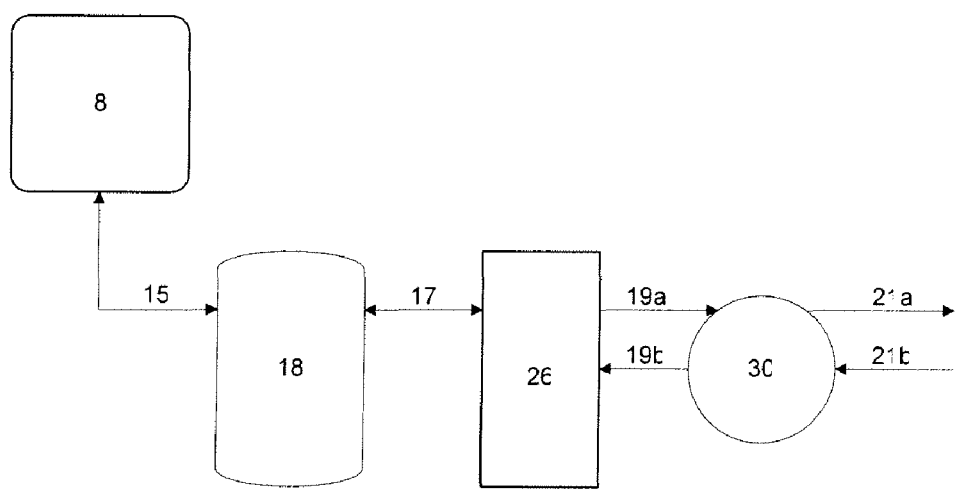
FIG. 7 is a block diagram detailing the generating side of the complete illustrative embodiment of the invention.
Figure 5:
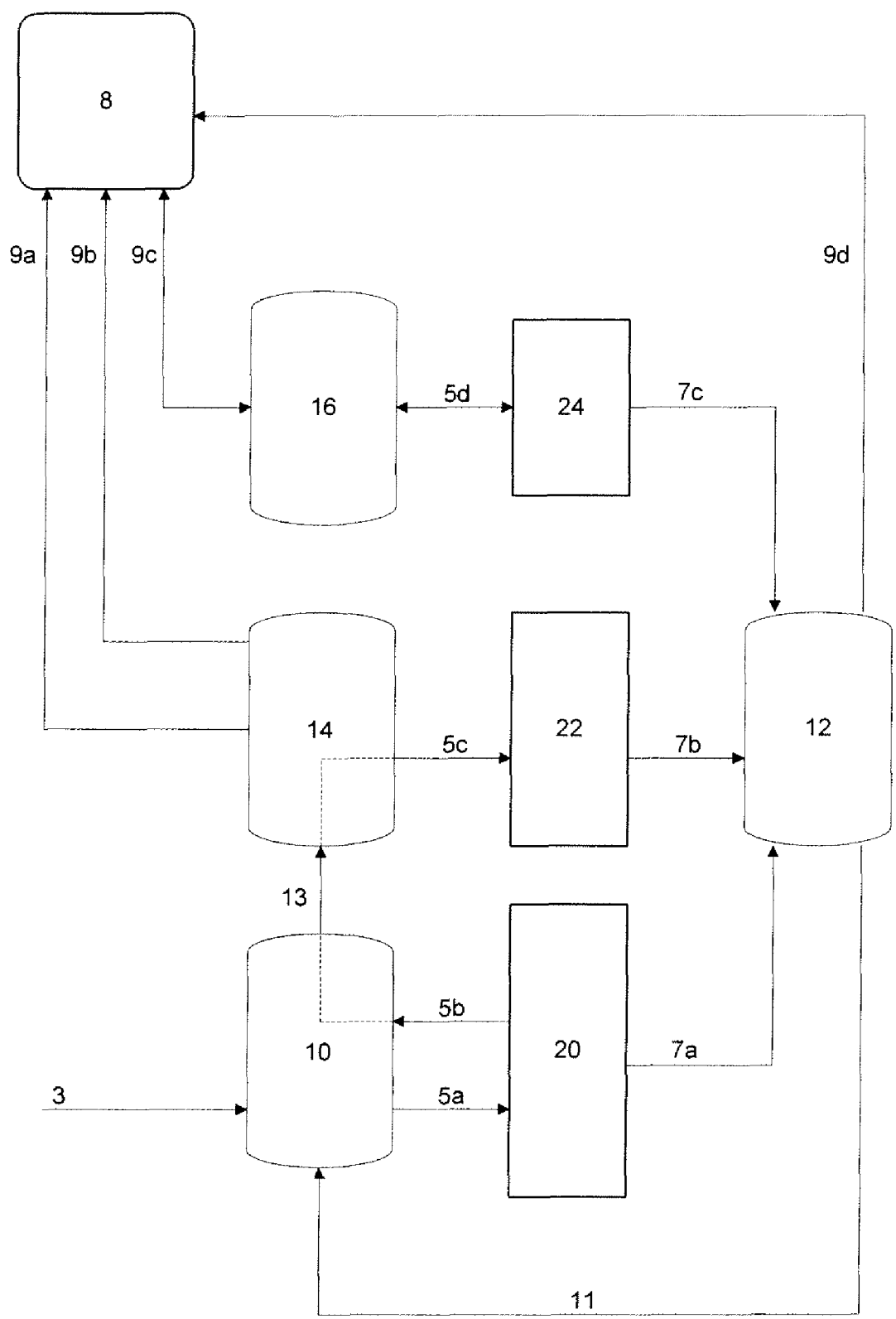
FIG. 5 is a block diagram detailing the monitoring side of the complete illustrative embodiment of the invention.

In addition to monitoring TTI messages, the illustrative embodiment of the present invention is also able to generate such messages. As shown in FIG. 7, a message can be inserted into the OTN frame datapath from REGMAP (8). REGMAP (8) interfaces with (15) a "Generation Insert Read/Write Finite State Machine" (18), which, in turn, writes the message (17) into a 64 byte "Insert Message RAM" (26). Similar to the TTI Monitoring function, the TTI Generation function is a continuous cycle which allows for data to be constantly read out of (19a) and written into (19b) Insert RAM (26) from the OTN frame datapath via output signals (21a) and input signals (21b) from a small control circuit (30), where necessary.

A mailbox communications method (1) is again employed to allow REGMAP (8) to access the information. Again, allowing REGMAP (8) to access Insert RAM (26) through a mailbox communications method (1) is possible by: (a) setting an address for a data location within RAM; (b) setting a request to read from, or write to, said data location within RAM; (c) issuing a "GO_" signal to retrieve data information from the data location within RAM, by writing the "GO_" signal to REGMAP (8), which causes the circuit to read from the requested data location within RAM; and (d) waiting for a possible, but not to be expected, de-assertion of a busy signal to be issued from the data location within RAM, then (e) reading back the value to REGMAP (8). When performing a microprocessor read out of Insert RAM (26), the read address is configured, a read request is generated, and the value is sent back to REGMAP (8), where it is stored in a user-accessible register within REGMAP (8). The data stored in Insert RAM (26) is inserted into the datapath by using the MFAS value as the address to Insert RAM (26). Data is then read out of the second port, or port B, of Insert RAM (26) and inserted into the correct frame of the multiframe.

Because both the trace monitoring and trace generating aspects of the present invention utilize dual-port RAM and FSMs, and employing a mailbox communications method to allow the microprocessor to access the message data stored in RAM, the size of the circuit is dramatically reduced. A normal OTN frame block contains 8 TTI messages, which includes approximately 12000 Look-Up Tables (LUTs). However, employing the present invention reduces the LUT count to approximately 4000 when employed in OTN, a circuit size reduction of approximately 300%.

REFERENCES CITED

US Patent Documents

| | |
|---|---|
| 5,185,736 | Tyrrell, et al. |
| 5,742,765 | Wong, et al. |
| 5,822,304 | Brody, et al. |
| 6,952,824 | Hooper, et al. |
| 7,068,685 | Sihvola |
| 20070180431 | Agarwala; Manish; et al. |

Other References

Goralski, Walter. SONET/SDH. $3^{rd}$ ed. Toronto: McGraw-Hill, 2002.
"Interfaces for the Optical Transport Network (OTN)." International Telecommunication Union, G.709/Y.1331.03/2003.
Ford, W. S., and V. C. Hamacher. "Hardware Support for Inter-process Communication and Processor Sharing" International Symposium on Computer Architecture: Proceedings of the 3rd Annual Symposium on Computer Architecture. 1976. pp. 113-118.

We claim:

1. A system comprising:
register map circuitry coupled to a processor and an elastic store, wherein the register map circuitry is configured to:
receive a request for data from the processor;
receive the data from the elastic store in response to requesting the data from the elastic store; and
store the data in a memory of the register map circuitry, wherein:
the data stored in the memory of the register map circuitry is accessible by the processor,
the processor is configured to access the elastic store for read and write operations using a mailbox communication method, and
the system further comprises control circuitry configured to:
set an address for a data location of the requested data within the elastic store;
set a request to read from or write to the data location of the requested data within the elastic store; and
receive, at the register map circuitry, a signal issued by the processor, wherein the register map circuitry is further configured to request the data from the data location within the elastic store in response to the received signal.

2. The system of claim 1, wherein the register map circuitry is further configured to:
receive further data from the processor; and
write the further data to the elastic store.

3. The system of claim 1, wherein the control circuitry is further configured to wait for a de-assertion of a busy signal associated with the data location of the requested data within the elastic store.

4. The system of claim 3, wherein the control circuitry is further configured to:
issue, with the processor, in response to receiving the busy signal, a further signal to the register map circuitry, wherein the register map circuitry is further configured to request the data from the data location within the elastic store in response to the issued further signal.

5. The system of claim 1, wherein the register map circuitry is further configured to receive expected data from the processor, further comprising control circuitry configured to:
compare the expected data to data stored in the elastic store; and
provide an indication to the register map circuitry in response to detecting a disparity between the expected data and the data stored in the elastic store.

6. The system of claim 1, wherein the data received from the elastic store comprises a portion of an OTN frame, a SONET frame, or an SDH frame.

7. The system of claim 1, further comprising control circuitry configured to:
receive a plurality of incoming frames on a datapath; and
store portions of the plurality of incoming frames in the elastic store in response to determining that a predetermined number of the portions of the plurality of incoming frames are equal to each other.

8. A method comprising:
receiving, with register map circuitry coupled to a processor and an elastic store, a request for data from the processor;
receiving, with the register map circuitry, the data from the elastic store in response to requesting, with the register map circuitry the data from the elastic store; and
storing the data in a memory of the register map circuitry, wherein:
the data stored in the memory of the register map circuitry is accessible by the processor, and
the processor is configured to access the elastic store for read and write operations using a mailbox communication method;
setting, with control circuitry, an address for a data location of the requested data within the elastic store;

setting, with control circuitry, a request to read from or write to the data location of the requested data within the elastic store; and receiving, at the register map circuitry, a signal issued by the processor, wherein the register map circuitry is further configured to request the data from the data location within the elastic store in response to the received signal.

9. The method of claim 8, further comprising:

receiving, with the register map circuitry, further data from the processor; and writing, with the register map circuitry, the further data to the elastic store.

10. The method of claim 8, wherein the control circuitry is further configured to wait for a de-assertion of a busy signal associated with the data location of the requested data within the elastic store.

11. The method of claim 10, further comprising:

issuing, with the processor, in response to receiving the busy signal, a further signal to the register map circuitry, wherein the register map circuitry is further configured to request the data from the data location within the elastic store in response to the issued further signal.

12. The method of claim 8, further comprising:

comparing expected data received from the processor to data stored in the elastic store; and providing an indication to the register map circuitry in response to detecting a disparity between the expected data and the data stored in the elastic store.

13. The method of claim 8, wherein the data received from the elastic store comprises a portion of an OTN frame, a SONET frame, or an SDH frame.

14. The method of claim 8, further comprising:

receiving a plurality of incoming frames on a datapath; and storing portions of the plurality of incoming frames in the elastic store in response to determining that a predetermined number of the portions of the plurality of incoming frames are equal to each other.

15. A system comprising:

register map circuitry coupled to a processor and an elastic store, wherein the register map circuitry is configured to:

receive, from the processor, a request for a portion of a frame received on a datapath, wherein the portion of the received frame comprises an identifier of a source of the received frame and an identifier of a destination of the received frame;

receive, from the elastic store, the portion of the received frame from the elastic store in response to transmitting a request to the elastic store for the portion of the received frame; and store the portion of the received frame in a memory of the register map circuitry, wherein:

the processor is configured to access the portion of the received frame stored in the memory of the register map circuitry, the processor is configured to access the elastic store for read and write operations using a mailbox communication method, and the system further comprises control circuitry configured to:

set an address for a data location of the requested data within the elastic store;

set a request to read from or write to the data location of the requested data within the elastic store; and receive, at the register map circuitry, a signal issued by the processor, wherein the register map circuitry is further configured to request the data from the data location within the elastic store in response to the received signal.

16. The system of claim 15, wherein the register map circuitry is further configured to:

receive a request from a processor to insert a further portion of a frame into a further frame that is to be transmitted on the datapath, wherein the further portion of the frame that is to be transmitted on the datapath comprises an identifier of a source of the further frame that is to be transmitted on the datapath and an identifier of a destination of the further frame that is to be transmitted on the datapath; and transmit, to the elastic store, a request to store the further portion of the frame to be inserted into the further frame that is to be transmitted on the datapath.

* * * * *